PULSER
Filed May 31, 1968
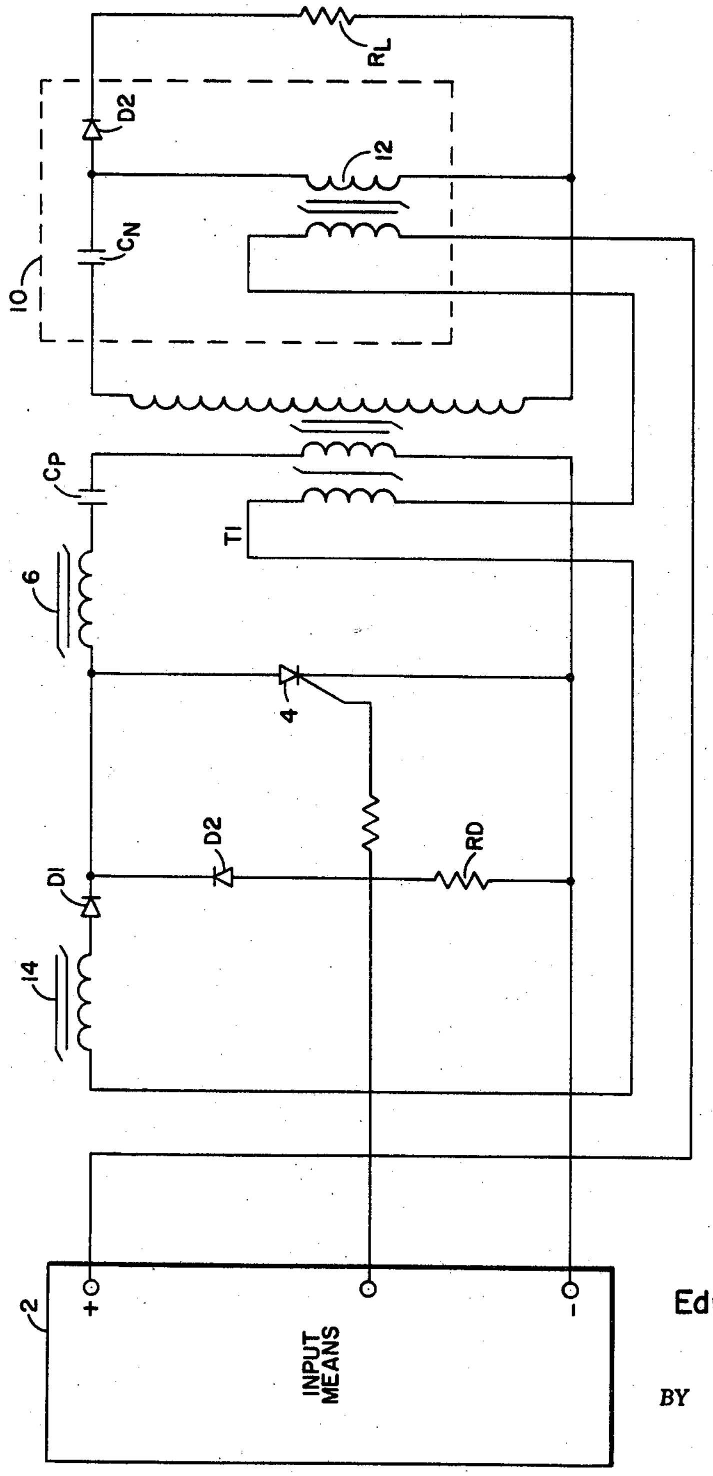
Edward A. Farrell,
INVENTOR.
BY Harry M. Saragovitz
Edward J. Kelly
Herbert Berl
Aubrey J. Dunn

United States Patent Office 3,496,476
Patented Feb. 17, 1970

3,496,476
PULSER

Edward A. Farrell, Uniondale, N.Y., assignor, by mesne assignments, to the United States of America as represented by the Secretary of the Army Filed May 31, 1968, Ser. No. 734,190
Int. Cl. H03k 3/53, 3/57
U.S. Cl. 328—67 5 Claims

ABSTRACT OF THE DISCLOSURE

A pulser for a GaAs diode laser wherein the discharge of a capacitor charged by a supply voltage is controlled by a silicon controlled rectifier through a pulse forming network to the load.

BACKGROUND OF THE INVENTION

There is a need for a device for pulsing a diode laser which has a duty cycle less than one-half. A pulse repetition frequency of 2.5 kiloHertz and a pulse duration of ten nanoseconds is required. The device further requires a current capability of 150 amperes.

SUMMARY OF THE INVENTION

This invention makes use of the unique advantages offered by magnetic switching devices, pulse compression techniques, and line configuration. A primary storage capacitor is charged when the supply voltage is applied. A short time later a silicon controlled rectifier is turned on, but discharge of the storage capacitor is delayed by a saturable reactor. When the reactor saturates, the storage capacitor discharges through the silicon controlled rectifier and the primary of a saturable transformer. The transformer saturates immediately following the energy transfer, thereby isolating the primary circuit and allowing the discharge of a pulse forming network through the load.

BRIEF DESCRIPTION OF THE DRAWING

The single figure drawing is a schematic diagram of a solid state pulser according to the present invention.

DESCRIPTION OF THE PREFERRED EMBODIMENT

When the supply voltage is applied by input means 2, primary energy storage capacitor $C_p$ is charged to the desired level. A short time later the silicon controlled rectifier 4 is turned on by a voltage pulse from input means 2. Input means 2 comprises a D.C. voltage source and a pulsing source for keying silicon controlled rectifier 4. Input means 2 has state-of-the-art circuitry to supply voltage to and to periodically supply a keying pulse to the silicon controlled rectifier. Diode D1 is used to hold the charge on capacitor $C_p$ until the silicon controlled rectifier is fired. The saturable reactor 6 delays the discharge of capacitor $C_p$ until the silicon controlled rectifier is fully on. When the saturable reactor 6 saturates, capacitor $C_p$ discharges through the silicon controlled rectifier and the primary of saturable transformer T1. Damping network D2 and $R_D$ protect the silicon controlled rectifier from excessive reverse power dissipation following primary discharge. Amplitude and duration of the discharge current are principally determined by condenser $C_p$, the saturated reactor inductance, and the reflected secondary impedance of transformer T1. If the value of capacitor $C_p$ equals the reflected capacitance of the pulse forming network 10, all the energy stored on capacitor $C_p$ is transferred to the pulse forming network. Saturable transformer T1 is designed to saturate immediately following the energy transfer, thereby isolating the primary circuit and allowing discharge of the pulse forming network through resistor $R_L$. Negative reflection in the primary of T1 is used to enhance silicon controlled rectifier turn-off. Saturable reactor 12 is used to remove any negative reflections or post-pulse oscillations in the secondary of transformer T1. Capacitor $C_N$ discharges through diode D2, the load $R_L$ and the secondary winding of transformer T1. Immediately following the discharge of capacitor $C_N$, saturable reactor 12 saturates. The bias windings on T1 and saturable reactor 12 are used to reset the cores during the resonant charging time. Inductor 14 isolates the supply until the silicon controlled rectifier has recovered to its off state. The bias windings on T1 and saturable reactor 12 are used to reset the cores during the charging time.

It will be apparent to those skilled in the art that changes may be made in the form of the apparatus disclosed without departing from the spirit of the invention as set forth in the appended claims, and that in some cases certain features of the invention may sometimes be used to advantage without a corresponding use of the other features. Accordingly, the scope of this invention is to be limited only by the appended claims.

I claim:

1. A pulser comprising: a silicon controlled rectifier, a first saturable reactor, a first capacitor, and the primary winding of a saturable transformer connected in series; a pulse forming network, a load, and the secondary winding of said saturable transformer connected in series; and input means for periodically charging said first capacitor and turning on said silicon controlled rectifier whereby the charged capacitor discharges through said silicon controlled rectifier, said first saturable reactor and said saturable transformer, said pulse forming network comprising a second capacitor, a second saturable reactor and a first diode; said second capacitor and said second saturable reactor being connected in series with said secondary winding of said saturable transformer; the anode of said first diode being connected between said second capacitor and said second saturable reactor; said load being series connected with said first diode and said second saturable reactor, whereby the saturation of said saturable transformer and the resetting of said second saturable reactor permits the charge stored on said second capacitor to discharge through seaid first diode and said load.

2. A pulser as set forth in claim 1 further comprising a third saturable reactor and a second diode, and wherein said input means has a first, second and third output; said second saturable reactor includes a reset winding; said saturable transformer includes a reset winding: said reset windings and said third saturable reactor being series connected between said first output and the anode of said second diode; the cathode of said second diode being connected between said anode of said silicon controlled rectifier and said first saturable reactor.

3. A pulser as set forth in claim 2 wherein the cathode of said silicon controlled rectifier is connected to said second output of said input means and the gate of said silicon controlled rectifier is connected to said third output of said input means.

4. A pulser as set forth in claim 3 to further include a third diode and a resistor, said third diode and said resistor being series connected parallel with said silicon controlled rectifier, the cathode of said third diode being connected to said anode of said silicon controlled rectifier.

5. A pulser as set forth in claim 4 wherein said first output is positive and said second output is negative.

References Cited

UNITED STATES PATENTS 3,296,551 1/1967 Staples ----------- 328—67 X

RODNEY D. BENNETT, Jr., Primary Examiner

CHARLES E. WANDS, Assistant Examiner